Oct. 12, 1943.   E. SCHEEMAEKER   2,331,426
CREAM SEPARATOR
Filed March 12, 1940    2 Sheets-Sheet 1
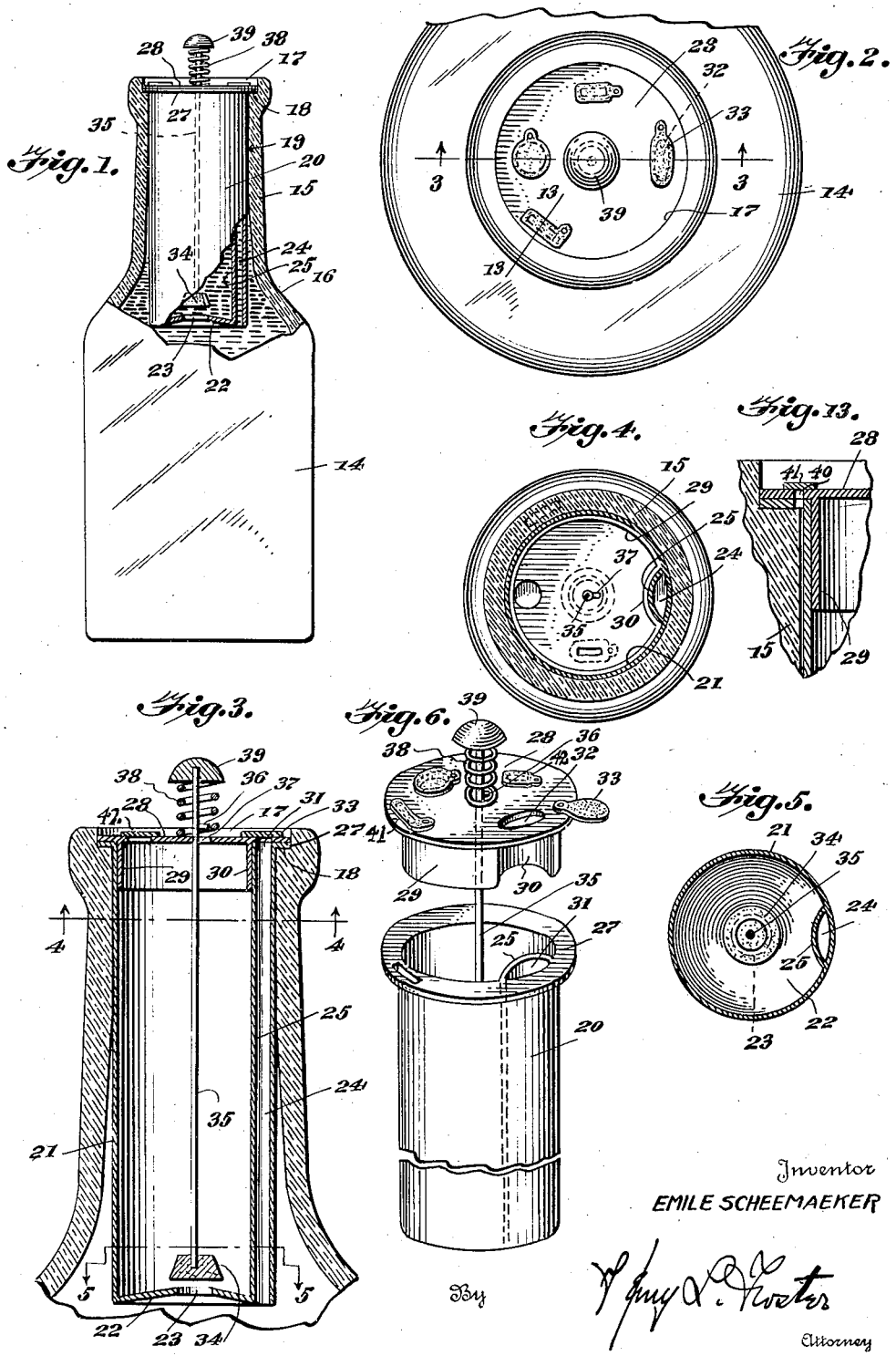
Inventor
EMILE SCHEEMAEKER Oct. 12, 1943.　　　E. SCHEEMAEKER　　　2,331,426
CREAM SEPARATOR
Filed March 12, 1940　　　2 Sheets-Sheet 2
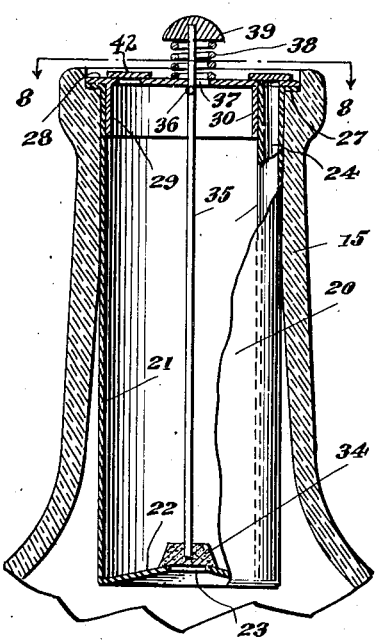
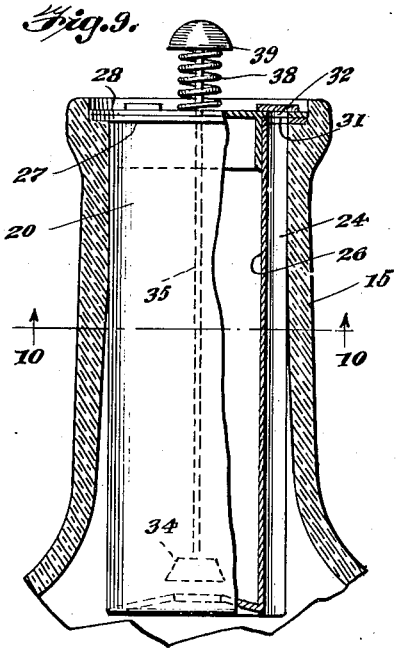
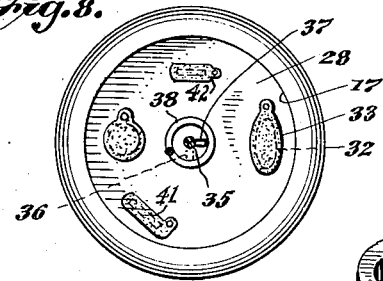
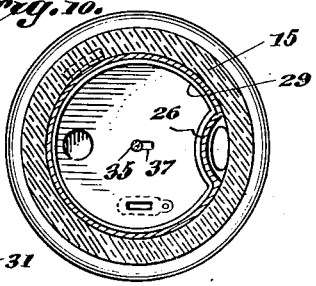
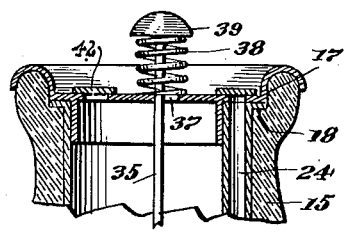
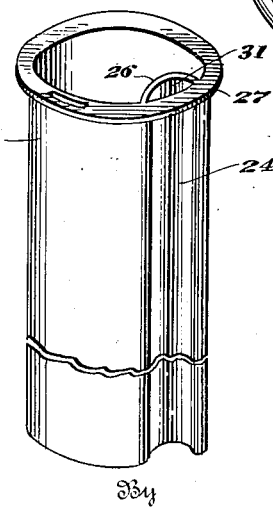
Inventor
EMILE SCHEEMAEKER
By
Attorney Patented Oct. 12, 1943

2,331,426

UNITED STATES PATENT OFFICE 2,331,426

CREAM SEPARATOR

Emile Scheemaeker, Woonsocket, R. I.

Application March 12, 1940, Serial No. 323,617

3 Claims. (Cl. 210—51.5)

This invention relates to the separation of milk and cream within the bottles in which milk is delivered, wherein the separation is effected while both the milk and the cream are retained in the bottle, and either may be poured from the bottle at the option of the user.

Lengthy investigation of the problems involved in such a practice and much experimentation have shown conclusively that not only must the separation be accomplished satisfactorily, but the bottles in which the milk is contained must conform quite closely to certain standards that prevail in the dairy industry. Conformance with these standards is necessitated as a practical matter by dairy equipment, as bottling, capping and bottle cleaning machines, and furthermore, by bottle manufacturing processes. The standards require definite heights and content capacity of bottles, definite diameter of the lower portion or body of the bottle, and very definite dimensions and configurations of the mouths of the bottles.

Standard types of milk bottles, whether of the kind having a bulged neck that forms a cream chamber, or of the older kind having a neck outwardly and downwardly curving from the mouth and merging gradually with the body of the bottle, while they are satisfactory for use with bottling equipment, and are well suited to standard bottle manufacturing practice, are not suitable for separation of milk and cream within the bottle with either accessible. Such separation can be most readily accomplished by inserting a receptacle for the cream within the neck of the bottle, closing off the cream space from the body portion or milk space when the cream has entered the receptacle, and providing passage for the milk alongside of the interior of the receptacle. Obviously, a neck that curves outwardly within the dimensions, or part of the bottle, containing cream, prevents the use of a receptacle closely conforming in shape with the bottle walls enclosing the cream space, and use of a cylindrical straight-walled container in such a bottle entails the exclusion of a material quantity of cream from its interior, due to the distance between the wall of such container and the outwardly curving wall of the bottle.

One object of this invention is to provide a bottle, the configuration of which permits conformance with the standard requirements of milk packing and bottle manufacturing practices, which is so arranged as to provide a cream space adapted to be substantially entirely enclosed within an inserted receptacle.

Another object is to provide a novel separator assembly for use with such a bottle.

Still another object is to provide a novel combination of separator and bottle, whereby efficient separation will be accomplished in a way that is practical in every respect.

In the accompanying drawings:

Figure 1 is a broken elevation of a milk bottle and separator constructed in accordance with this invention.

Figure 2 is a top plan.

Figure 3 is a sectional view on line 3—3 of Figure 2.

Figure 4 is a sectional view on line 4—4 of Figure 3;

Figure 5 is a horizontal section of a separator receptacle;

Figure 6 is a perspective showing the separator assembly.

Figure 7 is an enlarged vertical sectional view showing a separator assembly mounted in a bottle.

Figure 8 is a sectional view on line 8—8 of Figure 7.

Figure 9 is an enlarged vertical sectional view showing a separator assembly having a modified form of receptacle.

Figure 10 is a sectional view on line 10—10 of Figure 9.

Figure 11 is a perspective view of the modified receptacle.

Figure 12 is a fragmentary view of an assembly with a modified form of cover element.

Figure 13 is an enlarged and exaggerated sectional view showing means for admitting air to the bottle as milk is withdrawn.

Describing the drawings more particularly, the bottle of the present invention comprises a lower body portion 14 and an upstanding neck 15 connected with the body by a shoulder 16, and terminating in a mouth 17 surrounded by a cap seat 18. It is to be understood that the height of the bottle, the diameter of the mouth 17, the size and configuration of the seat 18 and the structure surrounding it are in accordance with standards prevailing in milk bottles.

The novelty of the present bottle lies in the formation of the neck. Whereas the neck of the ordinary bottle curves away from the limits of the mouth, the interior surface of the neck of the present bottle is, immediately below the mouth, truly cylindrical as shown at 19. The cylindrical shape of the portion 19 of the neck permits close engagement between the wall of the bottle and the outer surface of a cylindrical cream-receiving receptacle 20 that is mountable within the neck.

The size of the cream receptacle 20 is such that its capacity is slightly less than that necessary to receive the cream content that will separate from a charge of milk of the capacity of the bottle with which the separator is used. For example, for use with a one quart bottle, the receptacle should have a capacity of slightly less than four and one-half ounces of cream. Due to the mouth diameter, height and body diameter, of standard milk bottles, it is not possible to provide such a bottle with a truly cylindrical neck of sufficient capacity to receive wholly within it the total amount of cream. Furthermore, due to bottle-making practice, it is not practical to make milk bottles with necks that are truly cylindrical throughout their extents.

For the first reason above set forth, the neck 15 is tapered outward as it extends downwardly from a point spaced approximately half way between the mouth and the body of the bottle. Above this point, the interior of the neck is truly cylindrical, and as a practical matter the taper downward to the body may be made very small in degree, as illustrated in the drawings.

Because the neck cannot be made of sufficient capacity to receive all of the separated cream, the cream receptacle 20 is longer than the neck, and extends downward approximately the cream line of the bottle. By reason of this relation, a body of cream equal to the full capacity of the receptacle may be separated from the milk, and the cream left in the milk portion of the bottle is equal in volume to the relatively small space between the outer wall of the receptacle and the surrounding bottle wall. As a matter of fact, it is considered desirable for ordinary household purposes to leave a small amount of cream in the milk, rather than to separate it completely, and the amount outside of the separator is approximately correct to give a desirable quality to the milk.

The separator 20 comprises a body member having a cylindrical side wall 21, and a bottom wall 22 that has a central opening 23 for entry of cream. Along one portion of the wall 20, is a passageway 24 that is set off from the interior of the receptacle by an inwardly bowed wall. This wall may be either an extra wall member 25 within and secured to the sidewall 21, as shown in Figures 1 to 7, or it may be formed by an inwardly bowed portion 26 of the side wall as shown in Figures 9 to 11.

The side wall 21, at its upper margin terminates in a flange 27 of circular shape and proper size to seat securely in the cap seat 17 of the bottle. A closure element comprises a disk 28 suitable to overlie the flange 27 and seat in the cap seat, and such disk has a depending flange 29 for frictional engagement within the side wall. The flange 29 has an inwardly bowed portion 30 for close engagement about the passage wall 25 or 26, and within the area of the disk that is bounded by such portion, an aperture 31 is provided. It will be noted that the engagement of the bowed portion 30 with the passage wall insures registration of the aperture 31 with the passage, and that the closure cannot be improperly positioned upon the separator 20 due to engagement of the passage wall with the flange 29. An aperture 32 in the disk 28 overlies the open top of the receptacle 20, and both it and the aperture 31 are closed by valves, as the rotatably mounted plates 33.

In order to close the aperture 23 in the bottom of the container, to maintain cream and milk separate when the bottle is tilted as in pouring the milk, a stopper-valve 34 is mounted at the end of an operating rod 35, that extends through the disk 28 to above the top of the disk. The rod 35 carries a pin 36 that may pass through a slot 37 in the disk, the rod being rotatable in the disk, and the pin being so located upon the rod that when the pin is engaged with the under side of the disk, the stopper-valve 34 will be in position closing the opening 23. A spring 38 surrounding the rod 35 and bearing against a knob 39, at the end of the rod, and the top of the disk 28, serves to bias the valve to open position. Pressing the rod down, passing the pin 36 through the slot 37, and turning the rod serves to fix the valve in closed position.

In order to provide for entry of air to the body of the bottle as milk is withdrawn, a port 40 is provided in the closure element 28 in such position that it overlies a portion of the meeting surfaces of the bottle neck 15 and outer surface of the receptacle. The arrangement is shown exaggerated in Figure 13. It will be understood that there is a small clearance between the outer surface of the cream receptacle and the inner surface of the bottle wall adjacent the mouth. Such clearance is sufficient to permit air to enter to allow free flow of milk from the bottle. A valve 41 controls the port, being mounted upon the element 28. A similar valved port 42 opens into the interior of the receptacle to provide for admission of air as cream is withdrawn.

Operation of the above described structure will be readily understood. The receptacle 20 may be inserted, with the aperture 23 open, into a bottle of milk in which the cream has risen, thereafter the closure structure applied, and the rod 35 manipulated to close the aperture 23. Thereafter, by opening the proper valve 33, and the corresponding air admission port 40 or 42, either cream or milk may be poured from the bottle. If the cream has not risen when the receptacle is inserted, the valve member 34 may be maintained in raised position until separation has occurred, after which the aperture 23 is closed. When the valve has been seated in the aperture 23 the bottle may be shaken up or overturned to mix the cream that is outside of the receptacle with the milk in the body of the bottle.

It is thought that from the foregoing the construction, operation and many advantages of the herein described invention will be apparent to those skilled in the art, and it will be understood that changes in the size, shape, proportions and minor details of the structure disclosed may be resorted to without sacrificing any of the advantages of the invention or departing from its spirit as set forth in the accompanying claims.

What I claim is:

1. A cream separating assembly for insertion in the neck of a milk bottle to permit selective pouring from the bottle of milk or cream, the said assembly comprising a cream-receiving receptacle having an external cross sectional configuration matching the internal configuration of the bottle neck and of a height to substantially receive the cream from the bottle, the said receptacle having a bottom wall provided with a cream inlet, a valve controlling the said inlet, and a vertically disposed side wall, a vertical passage wall joined along its vertical edges with the vertical receptacle wall and bowed inwardly between such edges to enclose from the interior of the cream receptacle a milk passage extended from the bottom to the top of the receptacle, the said passage opening through the bottom wall of the separator, the said passage wall being located wholly within the bounds of the external configuration of the receptacle, a cap provided with openings mounted on top of the receptacle with the openings respectively overlying the interior of the receptacle and the milk passage, a valve controlling each of the said openings and means for controlling the valve of the cream inlet.

2. A cream separating assembly according to claim 1 wherein the vertically disposed passage wall encloses the milk passage between itself and the wall of the separator receptacle.

3. A cream separating assembly according to claim 1 wherein the cream receptacle is provided at its top with an outward flange for engagement in the cap seat of a milk bottle, the said flange is provided with an air inlet opening immediately adjacent and outside the outer surface of the vertical wall of the receptacle, and the cap is provided with an air inlet opening overlying the opening of the flange.

EMILE SCHEEMAEKER.